US010668700B2

(12) United States Patent
Barzegari et al.

(10) Patent No.: US 10,668,700 B2
(45) Date of Patent: Jun. 2, 2020

(54) CELLULOSIC ARTICLES MADE FROM CELLULOSIC MATERIALS AND METHODS THEREFOR

(71) Applicant: MASONITE CORPORATION, Tampa, FL (US)

(72) Inventors: Mohamad Reza Barzegari, St. Charles, IL (US); James P. Pfau, Kirkland, IL (US); Bei-Hong Liang, Naperville, IL (US); Elizalde Exconde, Bartlett, IL (US)

(73) Assignee: Masonite Corporation, Tampa, FL (US)

( * ) Notice: Subject to any disclaimer, the term of this patent is extended or adjusted under 35 U.S.C. 154(b) by 30 days.

(21) Appl. No.: 15/972,468

(22) Filed: May 7, 2018

(65) Prior Publication Data

US 2018/0319135 A1 Nov. 8, 2018

Related U.S. Application Data

(60) Provisional application No. 62/501,847, filed on May 5, 2017.

(51) Int. Cl.
| | | |
|---|---|---|
| *B32B 23/04* | (2006.01) | |
| *C08L 1/26* | (2006.01) | |
| *C08L 1/10* | (2006.01) | |
| *C08L 75/02* | (2006.01) | |
| *C08L 61/06* | (2006.01) | |
| *C08J 3/24* | (2006.01) | |
| *C08L 97/02* | (2006.01) | |
| *C08L 1/02* | (2006.01) | |
| *E06B 3/74* | (2006.01) | |

(52) U.S. Cl.
CPC ............. *B32B 23/044* (2013.01); *C08J 3/246* (2013.01); *C08L 1/02* (2013.01); *C08L 1/10* (2013.01); *C08L 1/26* (2013.01); *C08L 61/06* (2013.01); *C08L 75/02* (2013.01); *C08L 97/02* (2013.01); *E06B 3/74* (2013.01); *B32B 2607/00* (2013.01); *C08J 2301/02* (2013.01); *C08J 2301/10* (2013.01); *C08J 2301/26* (2013.01); *C08L 2205/03* (2013.01); *C08L 2312/04* (2013.01)

(58) Field of Classification Search
CPC ................................ C08L 97/02; B32B 23/044
See application file for complete search history.

(56) References Cited

U.S. PATENT DOCUMENTS

| | | | |
|---|---|---|---|
| 4,232,067 A | 11/1980 | Coleman | |
| 4,514,255 A | 4/1985 | Maxwell et al. | |
| 4,643,800 A | 2/1987 | Maloney et al. | |
| 4,726,881 A | 2/1988 | Schultz | |
| 5,543,234 A | 8/1996 | Lynch et al. | |
| 5,887,402 A | 3/1999 | Ruggie et al. | |
| 6,524,504 B2 | 2/2003 | Vaders | |
| 7,972,479 B2 | 7/2011 | Gane et al. | |
| 8,308,900 B2 | 11/2012 | Covarrubias et al. | |
| 8,691,340 B2* | 4/2014 | Stark | A01N 25/30 427/297 |
| 9,752,378 B2 | 9/2017 | Gouge et al. | |
| 2004/0103615 A1* | 6/2004 | Lynch | E06B 3/7001 52/784.1 |
| 2004/0163782 A1 | 8/2004 | Hernandez-Munoa et al. | |
| 2004/0220299 A1* | 11/2004 | Drabeck, Jr. | C08L 97/02 524/27 |
| 2005/0217206 A1* | 10/2005 | Liang | B27N 5/00 52/784.1 |
| 2007/0210473 A1* | 9/2007 | Wang | B27N 1/0263 264/109 |
| 2008/0187669 A1* | 8/2008 | Kingma | B27K 3/15 427/342 |
| 2008/0210393 A1 | 9/2008 | Guterrez-Suarez et al. | |
| 2009/0249716 A1* | 10/2009 | Pfau | E06B 3/822 52/204.1 |
| 2010/0087571 A1* | 4/2010 | Jackson | B27N 3/002 524/13 |
| 2010/0267866 A1* | 10/2010 | Lehtinen | C08L 97/02 524/13 |
| 2011/0045966 A1 | 2/2011 | Shooshtari et al. | |

(Continued)

FOREIGN PATENT DOCUMENTS

| | | |
|---|---|---|
| CN | 1149524 A | 5/1997 |
| DE | 19958756 A1 | 6/2001 |

(Continued)

OTHER PUBLICATIONS

Huntsman (Metalworking Chemicals, http://www.huntsman.com/performance_products/Media%20Library/global/files/Metalworking%20Chemicals_EN_Mar%202017_Global_US.pdf, 2016) (Year: 2016).*
Widiatmoko et al., "Extractive removal and selectivity improvement by various pretreatment methods prior to oxygen delignification for Acacia mangium and mixed hardwood kraft pulps" (Jan. 2007), abstract only, one page.

(Continued)

*Primary Examiner* — Liam J Heincer
(74) *Attorney, Agent, or Firm* — Berenato & White, LLC (57) ABSTRACT

The invention relates to systems and techniques for manufacturing articles containing cellulosic material, a coupling agent, and a binder resin, and related processes of making and using the cellulosic articles. In particularly exemplary embodiments, the manufactured articles are door skins, sometimes known as door facings, and doors made from the door skins. The article contains a lipophilic cellulosic material, a coupling agent, and a binder. The coupling agent is believed to increase the hydrophilicity (wetability) of the lipophilic cellulosic material.

19 Claims, 11 Drawing Sheets

(56) References Cited

U.S. PATENT DOCUMENTS

| | | | | |
|---|---|---|---|---|
| 2012/0121810 | A1* | 5/2012 | Grigsby, Jr. | C08G 18/3275 427/369 |
| 2014/0053489 | A1* | 2/2014 | Bryant | E06B 3/72 52/456 |
| 2014/0100308 | A1* | 4/2014 | Tseng | C08G 8/04 524/14 |
| 2014/0260080 | A1* | 9/2014 | Swartzmiller | E06B 3/72 52/784.1 |
| 2014/0371381 | A1* | 12/2014 | Holvoet | C09J 197/02 524/542 |
| 2015/0061177 | A1* | 3/2015 | Cote | C09J 175/04 264/115 |
| 2015/0151449 | A1* | 6/2015 | Birkeland | B27N 3/002 428/106 |
| 2017/0057118 | A1 | 3/2017 | Ozyhar et al. | |
| 2017/0361527 | A1* | 12/2017 | Saarikoski | C08L 67/04 |
| 2018/0362405 | A1* | 12/2018 | Tsujii | C08F 293/005 |
| 2019/0136015 | A1* | 5/2019 | Barzegari | C09J 161/24 |

FOREIGN PATENT DOCUMENTS

| | | |
|---|---|---|
| EP | 3093389 A1 | 11/2016 |
| KR | 20160132740 A | 11/2016 |
| WO | WO2002075045 A1 | 9/2002 |
| WO | WO2002083824 A1 | 10/2002 |
| WO | WO2007051907 A1 | 5/2007 |
| WO | WO2009082350 A2 | 7/2009 |
| WO | WO2015097653 A1 | 7/2015 |

OTHER PUBLICATIONS

"Selectivity improvement and extractive removal by various pretreatment methods prior to oxygen delignification for Acacia mangium and mixed hardwood kraft pulps", (n.d.), ten pages. Retrieved from http://biorefinery.utk.edu/technical_reviews/Pretreatment%20for%20Acacia%20extractives%20removal.pdf.

* cited by examiner

CELLULOSIC ARTICLES MADE FROM CELLULOSIC MATERIALS AND METHODS THEREFOR

CROSS-REFERENCE TO RELATED APPLICATIONS AND CLAIM TO PRIORITY

This application is related to provisional application No. 62/501,847, filed May 5, 2017 in the United States, the disclosure of which is incorporated herein by reference and to which priority is claimed.

FIELD OF THE INVENTION

This invention relates to systems and techniques for manufacturing articles containing cellulosic material, a coupling agent, and a binder resin, and related processes of making and using the cellulosic articles. In particularly exemplary embodiments, the manufactured articles are door skins, sometimes known as door facings, and doors made from the door skins.

BACKGROUND

Man-made consolidated cellulosic articles, such as fiberboard, hardboard, medium density fiberboard, and the like can be press molded or embossed to have three-dimensional shapes and/or various design and structural features found in natural wood. Types of useful consolidated cellulosic articles are referred to by terms such as: (a) fiberboards, such as hardboard (e.g., low-density or high-density hardboard), soft board, medium-density fiberboard (MDF), and high-density fiberboard (HDF); and (b) chipboards, such as particleboard, medium-density particleboard, and oriented strandboard (OSB). Such composite articles can be used as columns, floors, floor underlayment, roof sheathings, ceilings, walls, wall coverings, wainscots, partition systems, doors, door skins, and stairs in the construction of homes, offices, and other types of buildings, as well as furniture components, such as chairs, tables, countertops, cabinets, and cabinet doors, and other uses, such as bulletin boards, for example.

Various processes can be used to produce consolidated cellulosic articles, including wet-felted/wet press or "wet processes"; dry-felted/dry-pressed or "dry" processes; and wet-felted/dry-pressed or "wet-dry" processes. Such processes are discussed in further detail in U.S. Pat. No. 6,524,504, the disclosure of which is incorporated herein by reference. The disclosed invention is preferably implemented through use of a dry process in order to minimize environmental impact.

Conventionally, consolidated cellulosic articles typically include a formaldehyde-based binder, such as phenol formaldehyde or urea formaldehyde, to "glue" the cellulosic fibers together. Formaldehyde binders are low cost and compatible with the hydrophilic nature of cellulosic fiber, readily reacting with the high population of hydroxyl groups of cellulose, hemi-cellulose, and lignin components of the fiber to bind the fibers together.

Wood fibers used to make cellulosic articles conventionally are hydrophilic in nature due to hydroxyl groups, which interact well with water. However, as sources for common wood fibers dwindle, alternative wood sources are being considered. In certain countries, such as Malaysia, the government has emphasized the use of alternate plantation-based, fast-growing tree species as wood fiber sources. Some alternate wood fiber sources, possessing relatively high content of extractive, may be less desirable due to lipophilic (hydrophobic) components, such as pitch, fatty acid, glycerides and di/triglycerides, steryl esters, alkanol esters, wax, sterols, terpene alcohols, etc., in their fibers. For example, *Acacia* is an alternate wood fiber source. *Acacia* wood fiber has been undesirable for use in making consolidated cellulosic articles due to its high content of lipophilic components, which interfere with the efficacy of typical formaldehyde binders. Applicant has discovered that lipophilic-containing wood fibers, such as *Acacia* fibers, are not compatible with commonly used binders in a typical blowline resination process for thin MDF door skins, sometimes resulting in poor processing, such as by having a high mass spring back of the fiber mat, fiber mat cracking, poor surface quality, poor coatability, and/or poor glue adhesion.

Therefore, there remains a need to develop processes to enable the use of lipophilic-containing cellulosic fibers in the formation of consolidated cellulosic articles without decreasing mechanical properties.

SUMMARY OF THE INVENTION

According to a first aspect of the invention, a composite article is provided which contains a lipophilic-containing cellulosic material, a coupling agent, and a binder. The coupling agent is provided in an amount sufficient to increase the hydrophilicity (wetability) of the lipophilic-containing cellulosic material to the binder.

A second aspect of the invention provides a method for making the composite article. The method comprises the steps of treating the lipophilic-containing cellulosic material with a coupling agent to increase the hydrophilicity of the material, combining the treated cellulosic material with a binder to provide a composite mat, and pressing and heating the composite mat to form the composite article.

Other aspects of the invention, including methods, processes, articles, compositions, formulations, intermediates, activated fibrous materials, systems, kits, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION

Reference now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

The cellulosic articles described herein may be formed from a cellulosic material that has a relatively high lipophilic (hydrophobic) content (lipophilic cellulosic material or hydrophobic cellulosic material), e.g. when compared to tropical mixed hardwood (TMH). The lipophilic components can be present in the cellulosic material in an amount of at least 0.02 wt %, such as from 0.02 wt % to 5 wt % or more, based on the total weight of the cellulosic material. For purposes of the present invention, the term "lipophilic component" or the like is to be understood as meaning that the lipophilic component can be present in any manner and, therefore, can be considered as an impurity in the cellulosic material and/or a natural compound(s) found in the cellulosic material. Applicant has discovered that the lipophilic component renders the cellulosic material incompatible with commonly used binders in a typical blowline resination process for thin MDF door skins, sometimes resulting in poor processing, such as by having a high mass spring back of the fiber mat, fiber mat cracking, poor surface quality, poor coatability, and/or poor glue adhesion. Examples of lipophilic components include waxes, fatty acids, alkanols (e.g., white wax and/or long-chained OH compounds, such as $C_{24}$-$C_{28}$—OH, and/or high melting point alkanols of 90° C. or greater), hydroxy extractives, fatty alcohols, triglycerides, dyglycerides, sterols, steryl esters, phospholipids, and the like. Examples of fatty acids include fatty acids with an alkyl group of $C_4$-$C_{30}$, such as $C_{16}$-$C_{18}$ fatty acids, $C_{18}$-$C_{28}$ fatty acids, and/or $C_{20}$-$C_{26}$ fatty acids. The fatty acid can be saturated or unsaturated. A portion or all of the fatty acids can be bound or attached to other molecules, such as triglycerides or phospholipids. Other examples of lipophilic components include tetradecanoic (myristic, $C_{14}$); hexadecanoic (palmitic, $C_{16}$); 9,12-octadecadienoic (linoleic, $C_{18}$); 7-octadecadienoic ($C_{18}$); heptadecanoic (margaric, $C_{17}$) or octadecanoic (stearic, $C_{18}$); docosanoic (behinic, $C_{22}$); tetracosanoic (lignoceric, $C_{24}$); hexacosanoic (cerotic, $C_{26}$); and/or pentadecanoic ($C_{25}$). Another way to consider this extractive content is as a) the total unsaponifiable content (e.g., content of alkanols and sterols, and steryl esters); and b) the total fatty acids content. The lipophilic cellulosic material may be derived from *Acacia* wood, *Eucalytus* wood, cypress wood, rice straw, wheat straw as annual fibers, or combinations thereof. In the preferred embodiment, the lipophilic cellulosic material is derived from *Acacia* wood.

The lipophilic cellulosic material may be mixed with non-lipophilic cellulosic material (or common cellulosic material). The common cellulosic material include cellulosic material derived from a lignocellulosic material or biomass. Lignocellulose material is comprised of carbohydrate polymers (cellulose, hemicellulose) and lignin, which is an aromatic polymer, that forms the structure of plant cell walls. Preferably, the selected lingocellulose material is a hardwood and/or a softwood. Suitable species of softwood include, e.g., redwood, spruce, hemlock, and pine; and suitable species of hardwood include, e.g., *Acacia*, oak, cherry, maple, poplar, hickory, birch, and aspen. The wood may be refined or defibrated using a standard refiner/defibrator, or may be unrefined. The wood or other lignocellulosic materials discussed herein also may contain delignified fibers, if the fiber source is from recycled waste paper. Non-wood organic cellulosic materials that may be used in combination with wood or as an alterantive to wood include straw, kenaf, hemp, jute, bamboo culms, corn cobs, corn stover, other fibrous plants, and any combinations of two or more of such materials. Prefereably, the more fibrous parts of such plants, such as the rinds, are used instead of the entire plants. Also, recycled materials that may be used in combination with wood and/or other cellulosic materials described above or as an alternative thereto include recycled paper, pulp, or a combination including recycled paper and pulp.

The total cellulosic material (lipophilic and non-lipophilic) may be in the form of particles, powder, fibers, chips, strands, flakes, shavings, sawdust, etc., or combinations thereof. The preferred cellulosic material is fibers, particularly wood fibers for fiberboard products. The average dimensions of length and diameter for wood fibers are typically 3 mm and 20-35 micrometers for softwood species, and 1 mm and 20 μm for hardwood species. For thermal mechanically refined wood fibers, such as used for MDF manufacturing, certain portions of fiber furnish are fiber bundles (comprised of multiple individual fibers) that may have larger dimensions. Finer fibers have smaller dimensions especially with over refining. Other sizes outside the above ranges may be used so long as the cellulosic material is suitable for press molding. The cellulosic material may be pre-processed and obtained as byproducts from wood mills or furniture plants and may be broken down to the desired size by using hammermills or knives, as in flakers. The cellulosic material may be in a natural state and/or processed, for example, thermally refined and/or treated for composite wood fiber panel products.

In particularly exemplary embodiments, the total cellulosic material includes particles, fibers, or other comparable forms of wood within the noted size ranges. The particle or fiber size and distribution can be measured using a sieve testing device with a number of predetermined screens of different mesh sizes. It should be understood that depending on final products and their applications, a wide range of size distributions are considered to be within the scope of the present invention.

Processing of the total cellulosic material may be performed using a dry process, a wet-dry process, or a wet process. In an exemplary embodiment, a batch dry process is used and is preferred. Generally, a dry process involves conveying the cellulsoic material entrained in a gaseous or vapor stream or by using a fluidized bed. Atmospheric air may be used as the gaseous component of the fluidized bed.

The total cellulosic material may include about 20 wt % to about 100 wt % of the lipophilic cellulosic material, preferably about 50 wt % to about 100 wt %, more preferably about 75 wt % to about 100 wt %. The balance of the total cellulosic material may include one or more of the other noted cellulosic materials. In a preferred embodiment, the total cellulosic material includes greater than about 25 wt % of Acacia wood fibers, preferably about 50 to about 100 wt %, with the balance being made up of mixed tropical hardwood.

The lipophilic cellulosic material may be treated with the coupling agent prior to combining the lipophilic cellulosic material with a binder. However, the present invention also contemplates treatment of the lipophilic cellulosic material during or after the combination of the lipophilic-containing, cellulosic material with the binder. For example, the lipophilic cellulosic material may be combined with the binder prior to being treated with the coupling agent. The lipophilic cellulosic material may be combined with the binder while being treated with the coupling agent, as part of an in situ process. In that case, the lipophilic cellulosic material, binder, and coupling agent may be combined at the same tune. Binder addition may be separated into two or more steps taking place at different stages of the process, for example, to include in situ and ex situ treatment of the lipophilic cellulosic material relative to the binder. For example, the binder may be added to the lipophilic cellulosic material prior to and during treatment of the lipophilic cellulosic material with the coupling agent; prior and subsequent to treatment; during and subsequent to treatment; or prior to, during, and subsequent to treatment. Coupling agent treatment of the lipophilic cellulosic material also is carried out before pressing and heating to form the composite article.

In a first embodiment, coupling agent is first mixed with the binder to form a mixture. The mixture is then added to the lipophilic cellulosic material and mixed. In other words, the coupling agent and the binder are mixed before being added to the lipophilic cellulosic material.

In second embodiment, the binder is first added to the lipophilic cellulosic material to form a mixture. The coupling agent is then added to the a mixture. In this embodiment, the binder is added to the lipophilic cellulosic material and mixed before addition of the coupling agent.

In a third embodiment, the binder, the coupling agent, and the lipophilic cellulosic material are combined at the same time. In this embodiment, the three principal ingredients are added and mixed at the same time.

In a fourth further embodiment, the coupling agent is first added to the lipophilic cellulosic material to form a mixture. The binder is then added to the mixture. In this embodiment, the lipophilic cellulosic material is treated with the coupling agent before addition of the binder.

In a fifth embodiment, the coupling agent is added to the binder to form a mixture. The mixture is then added to the liphophilic cellulosic material along with additional coupling agent. This embodiment is essentially as a combination of the first and third embodiments, where the coupling is added twice during the process (first to the binder alone, and then to the binder/coupling agent mixture and the lipophilic cellulosic material).

Without being bound to a particular theory, it is believed that the coupling agent interacts with the lipophilic components to render them less lipophilic, and thus render the wood fibers suitably hydrophilic, which improves resin wetability of the fibers. Because Acacia fiber has relatively low surface energy, addition of the coupling agent increases the surface energy and improves the hydrophilicity of the Acacia fiber. In an embodiment, the coupling agent is an organic compound having a lipophilic portion and a hydrophilic portion. The lipophilic portion interacts with the lipophilic component of the wood fiber, while the hydrophilic portion decreases the lipophilicity of the lipophilic cellulosic material. The interaction of the coupling agent and the lipophilic component mainly includes secondary interaction forces, such as hydrogen bonding, dipole-dipole, dipole-induced dipole, van der waals, or combinations thereof. The lipophilic portion of the coupling agent may include, but not be limited to, linear or branched olefins of $C_4$ to $C_{30}$. The hydrophilic portion of the coupling agent may include, but not be limited to, hydroxyl groups, carboxyl groups, carbonyl, esters, ethers, glucoside, or combinations thereof. The coupling agents may be anionic or non-ionic, but preferably an non-ionic coupling agent is used. Preferably, the coupling agent has a hydrophilic/lipophilic balance (HLB) of about 7 to about 15, more preferably about 10 to about 14.

In a preferred embodiment, the coupling agent may be, but is not limited to, A) an ether, preferably having the chemical formula

(I)

B) an ester, preferably having the chemical formula

(II)

C) an amine, preferably having the chemical formula

(III)

(D) an amide, preferably having the chemical formula (IV)

or (E) a glucoside, preferably having the chemical formula (V)

wherein R is a saturated or unsaturated hydrocarbon chain having 9 to 30 carbons, preferably 9 to 18 carbons; and n is 2 to 15, preferably 3 to 8. The following non-limiting list of coupling agents may be used with the present invention: polyoxyethylene dioleate or dilaurate ester (available commercially as Mulsifan 600 DO-H or DL-H from Zschimmer-Schwarz), a coupling agent available commercially as PAT 2529/RC4 from Wurtz which is believed to be alcohol ethoxylate, polyoxyethylene alkylamine, such as polyoxyethylene (5) cocoalkylamines (available as Ethomeen C/15 from AkzoNobel), alkyl polyglucosides (available commercially as APG325 from BASF), octylphenol ethoxylate (available commercially as Triton X-35 from Dow), t-octylphenoxypolyethoxyethanol (available commercially as Triton X-100 from Dow), ethoxylated tridecyl alcohol (available commercially as Lutensol TDA 10 from BASF), or combinations thereof. The preferred coupling agent is polyoxyethylene dioleate or polyoxyethylene alkylamines. The ratio of coupling agent to lipophilic cellulosic material may be from about 0.1 wt % to about 5 wt %, preferably from about 0.5 wt % to about 2 wt %.

The lipophilic cellulosic material may be treated with the coupling agent by spraying, in an aqueous slurry, or by any method known in the art sufficient to allow the lipophilic cellulosic material and the coupling agent to come into contact, such as, during a typical thin MDF manufacturing process using *Acacia* fiber. In an embodiment, the lipophilic cellulosic material may be treated with the coupling agent by injecting the coupling agent through a port into a fiber refiner where wood chips are refined. During this process, the lipophilic cellulosic material comes into contact with the coupling agent while the wood chips are being refined into fibers, to allow modification of the lipophilic components to occur. The refining temperature can be as high as 170° C. (338° F.) under controlled steam pressure of up to about 1 bar to allow the fibers to pass through the refiner very quickly.

After mixing the lipophilic cellulosic material with the coupling agent and the binder to form a composite mixture, the composite mixture may be dried before further processing, e.g., to make the article. For example, the composite mixture may be further dried, e.g., through a flash tube dryer in a typical MDF manufacturing process.

As noted above, the lipophilic cellulosic material may be mixed with common cellulosic materials. The coupling agent treatment process may also occur prior to, during and/or after mixing of the cellulosic materials.

The composite mixture is formed by mixing the lipophilic cellulosic material, the coupling agent, and the binder. The composite mixture may contain about 10 to about 98 wt % lipophilic cellulosic material, preferably about 25 to about 98 wt %, about 0.1 to about 5 wt % coupling agent, preferably about 0.5 to about 2 wt %, and about 2 to about 12 wt % binder, preferably about 3 to about 10 wt %. The binder may be, but is not limited to, urea formaldehyde (LT), phenol formaldehyde (PF), melamine urea formaldehyde (mUF), polymethylene poly(phenyl isocyanates) (pMDI), or combinations thereof. Preferably, UF or PF is used as the binder.

The composite mixture containing the treated cellulosic material and binder may then be formed into a composite article by first forming the composite mixture into a cellulosic mat, and then consolidating the cellulosic mat under pressure and/or heat. Processes described, for example, in U.S. Pat. No. 5,543,234 to Lynch et al. and U.S. Pat. No. 4,726,881 to Schultz may be used. The mat may include one or more layers of the composite mixture, and be made according to methods known to those skilled in the art. A "dry" production process, i.e. a typical MDF manufacturing process, is preferred for the invention, but a wet/dry process can also be considered. In the dry process, the coupling agent remains in the final composite article and is not removed or extracted during the process.

The composite article is formed by consolidating the mat in a press, typically under heat and pressure, according to methods known to those skilled in the art. The treated mixture may be randomly formed into a mat by air blowing one or more layers of the treated mixture onto a support member. The mat, typically having a moisture content of less than or equal to about thirty weight percent (30 wt %), and preferably preferably 4-12 wt %, is then pressed under heat and pressure to cure the resin and to compress the mat into an integral consolidated structure. For example, typical pressing conditions for thin MDF door skins (about ⅛" in thickness) may include press temperatures of about 270-350° F. with UF resin and fiber moisture content of about 10-12%, and 380-420° F. with PF resin and fiber moisture content of about 4-6%. An exemplary press cycle time is about 50-70 seconds.

The composite articles produced contains cellulosic fibers which originally contained relatively high lipophilic content. However, upon treatment with the coupling agent, the lipophilic cellulosic fibers may be used to form composite articles which possess physical and mechanical properties similar or equal to those conventionally made from common cellulosic fibers, including no fiber mat cracking prior to pressing, high surface quality, excellent coatability, and/or excellent glue adhesion of the composite panels. The composite article produced may be (a) fiberboard, such as hardboard (e.g., low-density or high-density hardboard), soft board, and medium-density fiberboard ("MDF"); and (b) chipboard, such as particleboard, medium-density particleboard, and oriented strand board ("OSB"), and plywood. Most preferably, the composite articles are door skins (thin MDF), such as typically used to make solid core or hollow core doors.

Figure 11:
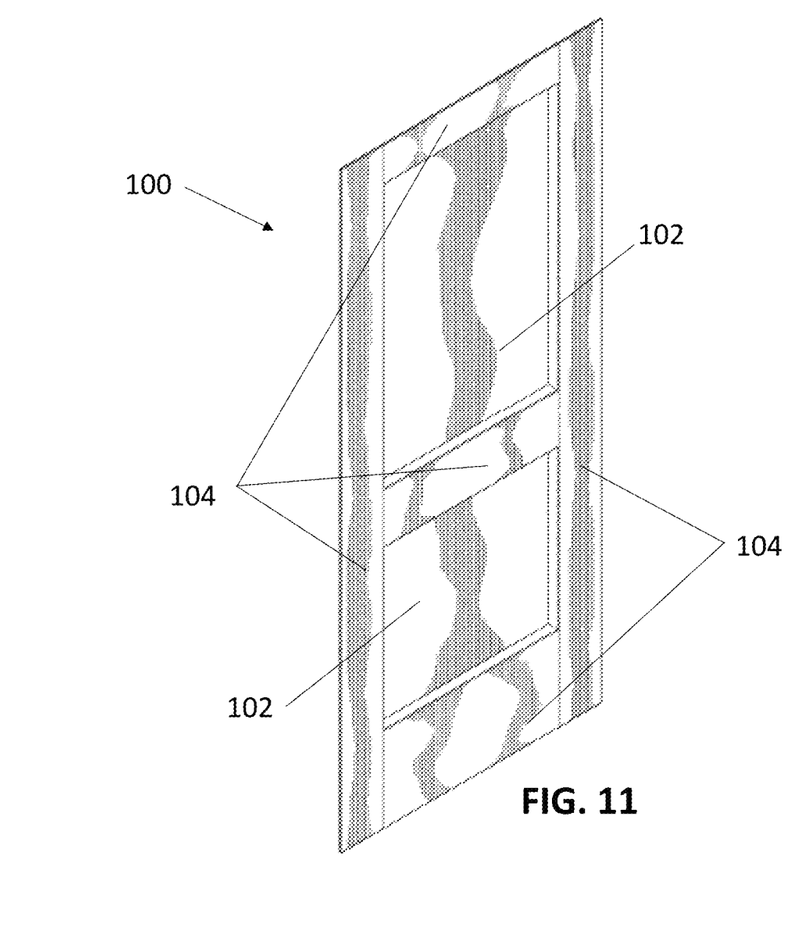
FIG. 11 is a drawing showing a perspective view of a door skin.

In an exemplary embodiment, as illustrated in FIG. 11, the composite article may be a molded door skin 100 with a plurality of panels. The door skin 100 may include a plurality of three dimensionally formed panels 102 and corresponding planar adjacent portions 104 that simulate stiles (vertical) and rails (horizontal). The panels 102 may be formed in the door skin 100 using various techniques. For example, the door skin 100 may be molded to include depressions or contours, sometimes called ovalos, that surround and assist in separating the panels 102 from the adjacent stiles/rails 104. While two panels 102 are illustrated in FIG. 11, any number of panels 102 may be formed within the door skin 100. Typically the panels 102 are coplanar with the top surface of the stiles/rails 104, with the peripheral portion, depressions, contours, ovalos, extending inwardly from the exterior planar surface. Alternatively, the panels 102 are coplanar with the plane of the stiles/rails 104, but are spaced therefrom, typically inwardly toward the interior of the door. The panels 102 with their surrounding peripheral portion, depressions, contours, ovalos, thus more accurately simulate a solid wood paneled door. The exterior surface of the door skin may be smooth or molded/embossed to simulate a design or pattern, such as a wood grain design. An exemplary conventional door with molded door facings is shown in U.S. Pat. No. 9,752,378, the disclosure of which is incorporated herein by reference.

Without further description, it is believed that one of ordinary skill in the art can, using the preceding description and the following illustrative examples, make and utilize the articles of the present invention and practice the claimed methods. The following examples are given to illustrate the present invention. It should be understood that the invention is not to be limited to the specific conditions or details described in the examples.

EXAMPLE 1

Acacia wood fibers and mixed tropical hardwood fibers were compared for their lipophilic content (extractives). The wood fibers were extracted with hexane at 240° F. for 5 hours to extract lipophilic components. The extract for Acacia fiber contained 1.21±0.3 wt % lipophilic components, while the mixed tropical hardwood contained 0.48±0.3 wt %.

Figure 1A:
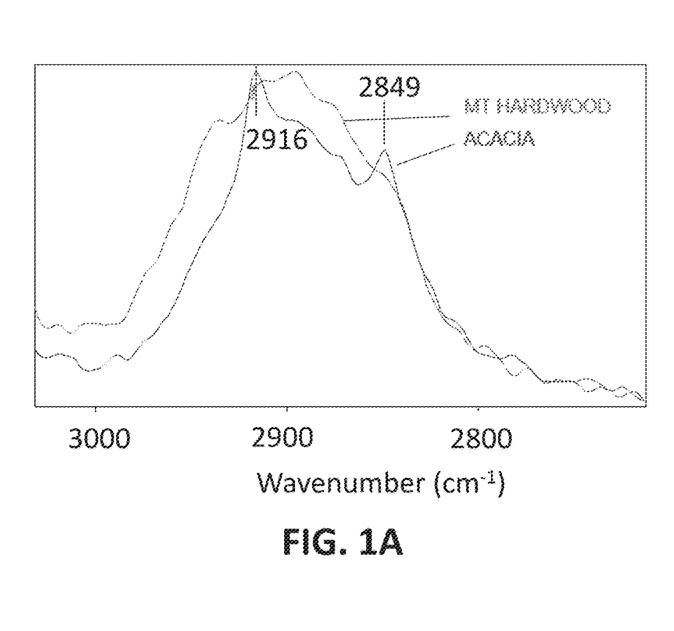
FIG. 1A and FIG. 1B are graphs showing the IR spectrums for *Acacia* fiber and mixed tropical (MT Hardwood) wood fiber.
Figure 1B:
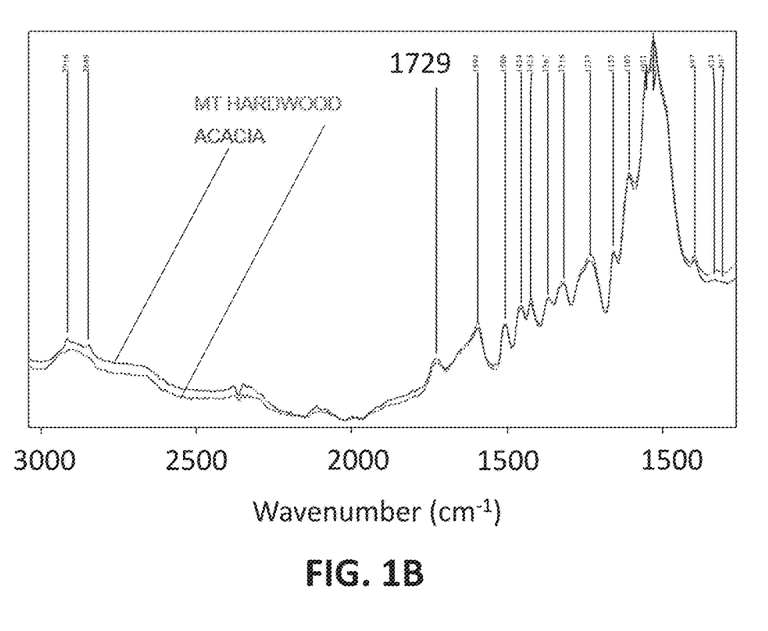

FIGS. 1A and 1B show infrared (IR) spectrums of Acacia fibers having absorption peaks at 1729, 2849 and 2916 cm$^{-1}$, which indicate the presence of fatty acids on the surface of Acacia wood fibers. Fatty acids are characterized by two sets of strong vibrations including 1) C—H symmetric stretch of —CH2 at 849 cm$^{-1}$ and C—H stretch (asymmetric) of >CH2 at 2916 cm$^{-1}$, and 2) the C=O mode of the side chain from ester carbonyl group at 1729 cm$^{-1}$.

Figure 2:
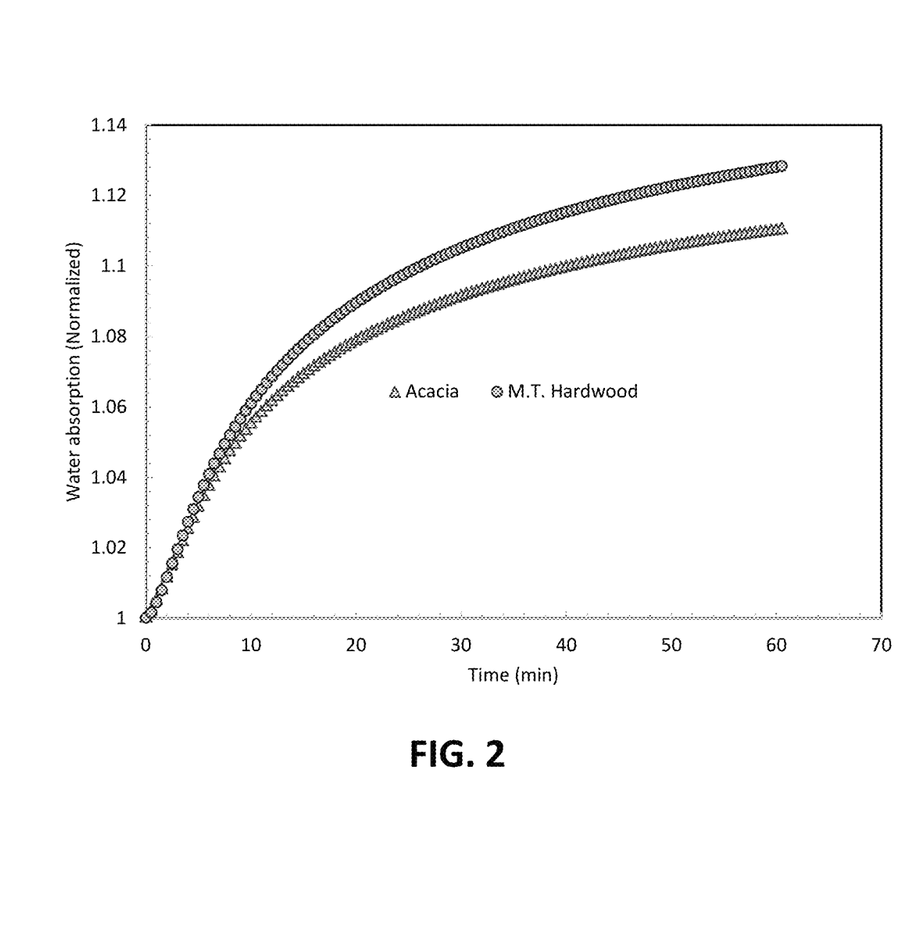
FIG. 2 is a graph showing water vapor absorption isotherms for different wood fiber species at 24° C. and 90% RE as a function of time.

FIG. 2 shows water vapor absorption isotherms results of Acacia fibers and mixed tropical hardwood fibers (MT Hardwood) at 90% relative humidity (RH) and 24° C. for 1 hour. The isotherms were measured using a Hiden Iscochema IGAsorp microbalance. Acacia fibers absorbed the lowest amount of water absorption, establishing that they were more lipophilic than the mixed tropical hardwood.

EXAMPLE 2

Figure 3:
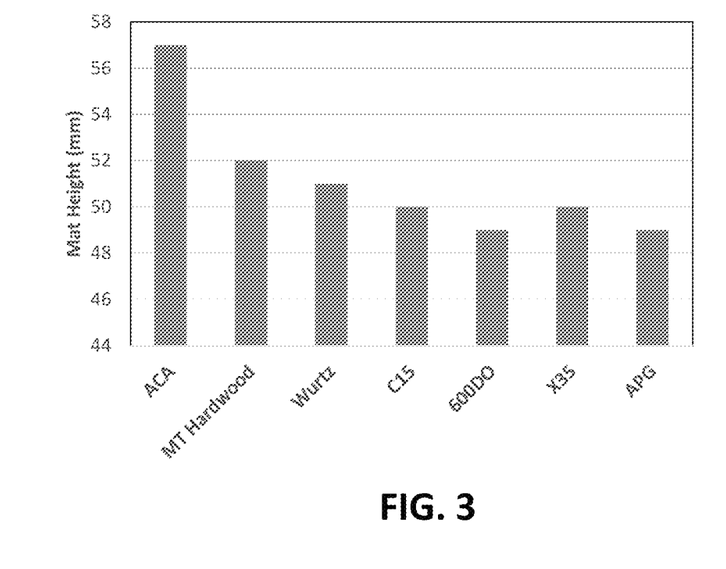
FIG. 3 is a graph showing the spring back of different mats.

Treatment of Acacia fibers can improve mat spring back, which is a main cause for cracking of the molded fiber mats. Fiber mats were formed using 1) Acacia wood fibers and UF as a binder (ACA)); 2) mixed tropical hardwood fibers and UF as a binder (MT Harwood); 3) Acacia wood fibers treated with PAT 2529/RC4 from Wurtz and UF as a binder (Wurtz); 4) Acacia wood fibers treated with Ethomeen C/15 from AkzoNobel and UF as a binder (C15); 5) Acacia wood fibers treated with Mulsifan PEG 600 dioleate from Zschimmer-Schwarz and UF as a binder (600DO), 6) Acacia wood fibers treated with Triton X-35 and UF as a binder (X35); and 7) Acacia wood fibers treated with APG325 from BASF and UF as a binder (APG). FIG. 3 shows that the coupling agent reduced the mat spring back of Acacia wood fiber composites (ACA) to an amount comparable to that of untreated hardwood composite (MT Harwood).

EXAMPLE 3

Figure 4:
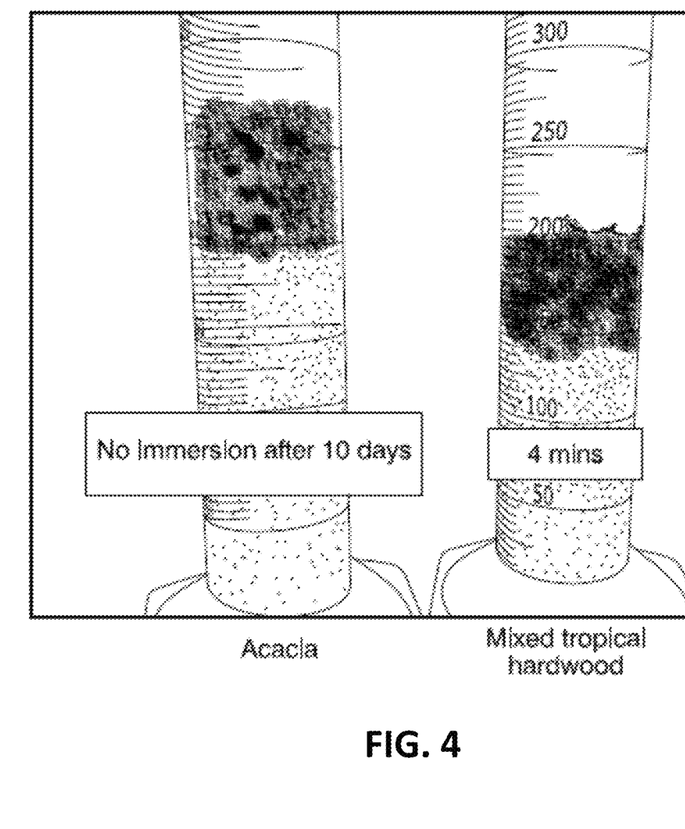
FIG. 4 is an illustration of a photograph showing *Acacia* and mixed tropical hardwood fibers in water.

Untreated Acacia and mixed tropical hardwood fibers were added to graduated cylinders containing water. The Acacia fiber floated on the water surface and was not soaked after 10 days (FIG. 4). On the other hand, the mixed tropical hardwood fiber was completely soaked with water after 4 minutes (FIG. 4) indicating that the mixed tropical hardwood fiber was hydrophilic. FIG. 4 also illustrates that the untreated Acacia wood fiber is hydrophobic.

Figure 5:
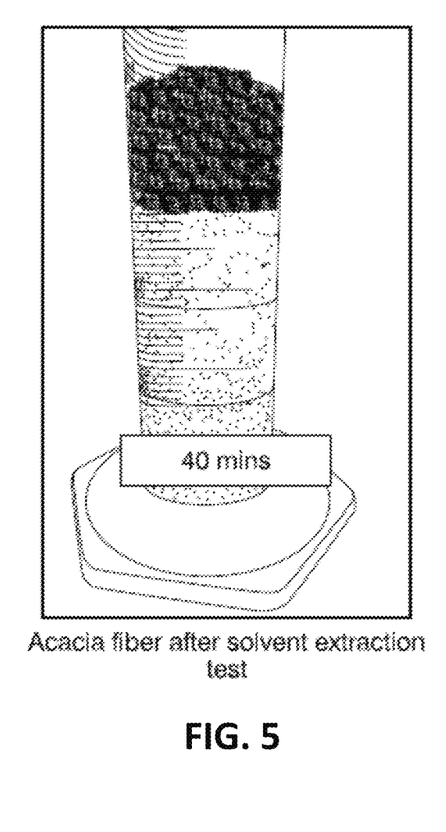
FIG. 5 is an illustration of a photograph showing extracted *Acacia* fiber in water.

The Acacia wood fibers were subsequently extracted with hexane to remove the lipophilic components from the Acacia wood fibers. The extracted Acacia wood fibers were added to a graduated cylinder containing water and became fully immersed in the water within 40 minutes (FIG. 5). Comparison of the extracted Acacia fibers (FIG. 5) with unextracted Acacia fibers (FIG. 4) indicates that Acacia wood fibers contained lipophilic components, which imparts water immersion resistance to the fibers. Extracting the lipophilic components from the Acacia fibers decreased the fibers' water immersion resistance.

Figure 6:
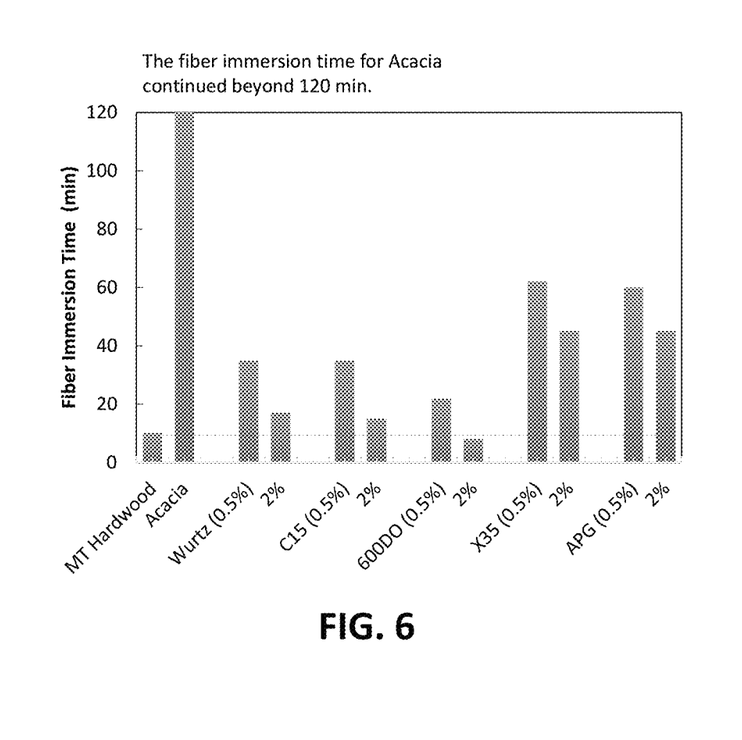
FIG. 6 is a graph showing floating times of wood fibers in water solutions containing different coupling agents.

Untreated Acacia wood fibers were sprayed with coupling agents, then added to graduated cylinders containing water. The coupling agents used were PAT 2529/RC4 from Wurtz (Wurtz), Ethomeen C/15 from AkzoNobel (C15), Mulsifan PEG 600 dioleate from Zschimmer-Schwarz (600DO), Triton X-35 from Dow (X35), and APG325 from BASF (APG). Each coupling agent was prepared at concentrations of 0.5 wt % and 2 wt % and sprayed onto the untreated Acacia fibers. FIG. 6 shows the floating times of the untreated Acacia fibers in the coupling agent solutions. The bar labeled "Hardwood" shows the floating time for mixed tropical hardwood fibers without any coupling agent. The bar labeled "Acacia" shows the floating time for Acacia fibers without any coupling agent. FIG. 6 demonstrates that the coupling agents decrease the floating time, and thus water immersion resistance of Acacia fibers.

Figure 7:
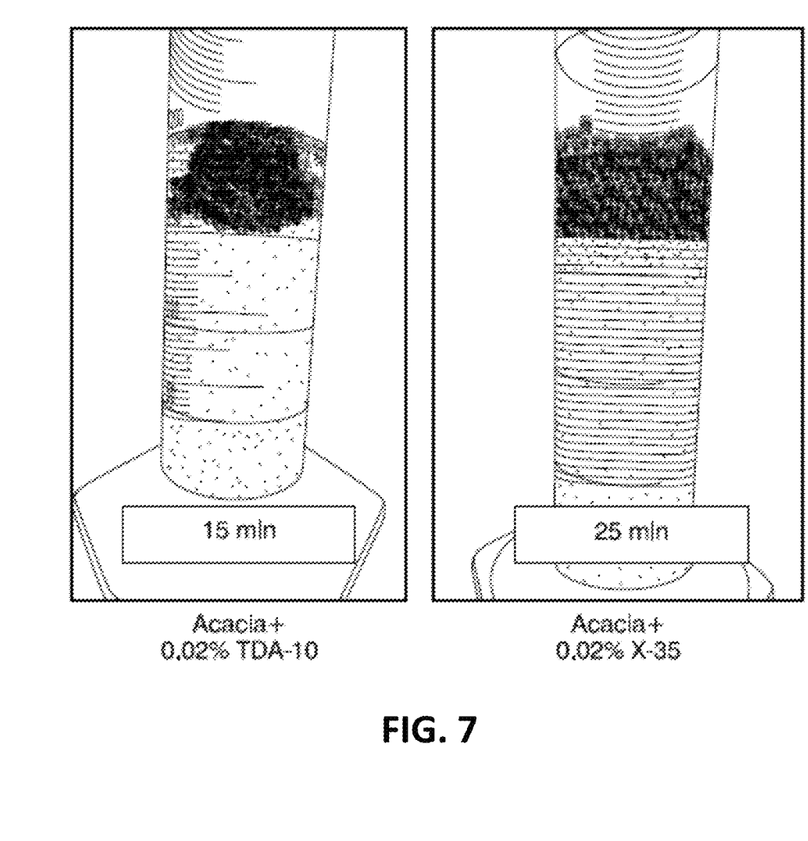
FIG. 7 is an illustration of a photograph showing *Acacia* fiber sprayed with different coupling agents positioned in water.

Untreated Acacia fibers were sprayed with two different coupling agents (Lutensol TDA 10 and Triton X-35), and then added to a graduated cylinder containing water. The sprayed Acacia fiber was soaked within 25 minutes (FIG. 7). The coupling agents are believed to increase the hydrophilicity of the Acacia fiber to allow for improved wettability, which improves the interaction of the fibers with the resin in forming the composite article.

EXAMPLE 4

Figure 8:
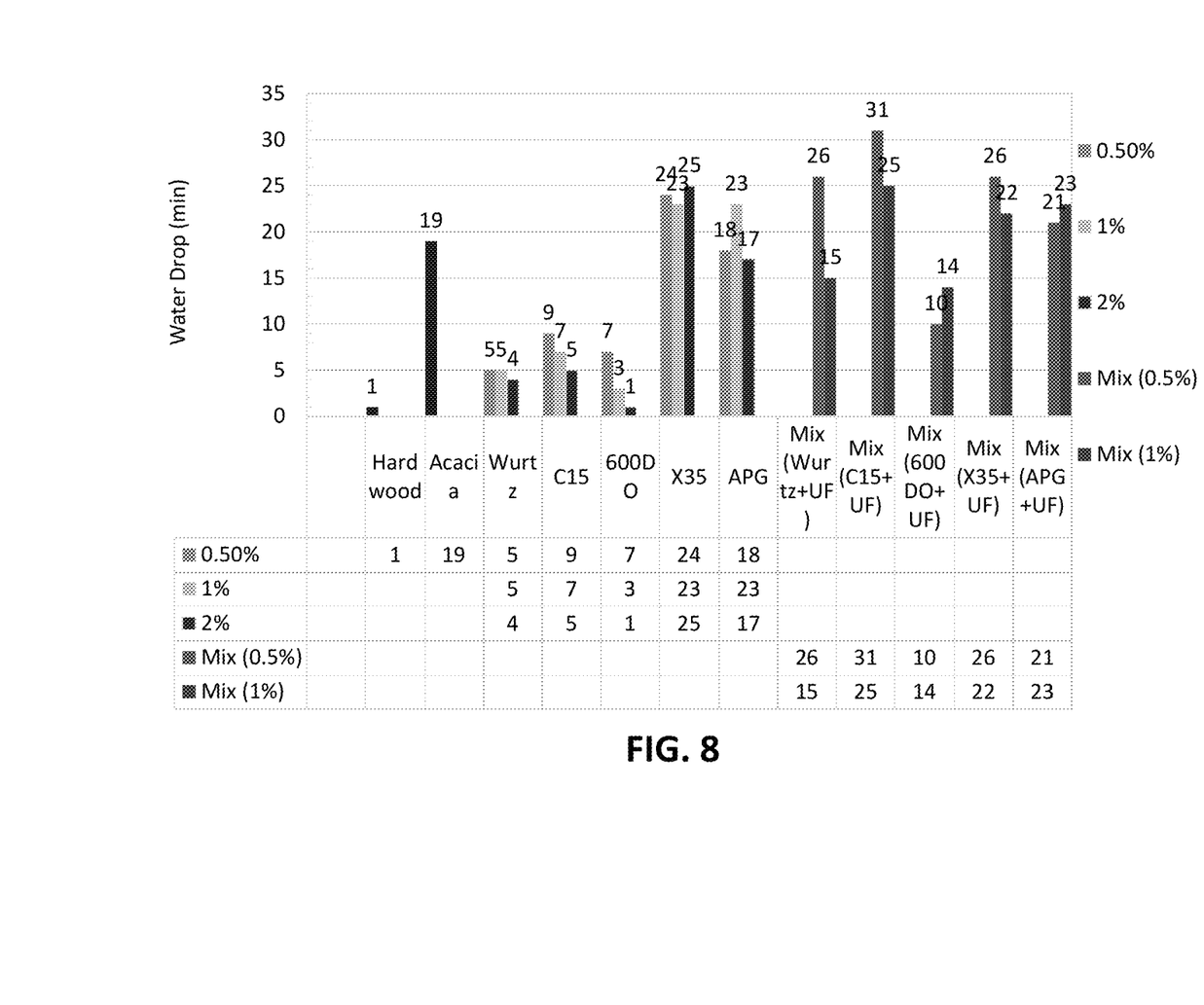
FIG. 8 is a graph showing the effect of coupling agents on the water drop lifetimes of fiberboards made from *Acacia* fibers.

The coupling agents were also investigated for their effect on water drop lifetime on fiberboards made from Acacia fibers. About a 10 mL drop of distilled water is deposited on the surface of the sample using a syringe. The lifetime of the drop is measured visually as the time from deposition to the formation of a matted wet spot, which signals complete soaking of the water into the fiberboard. The fiberboards were made by two methods: 1) first spraying the Acacia fibers with the coupling agents, and then mixing the fibers with UF binder to make the fiberboards; and 2) first adding the coupling agents to the UF binder, and then mixing the UF binder/coupling agent mixture with the Acacia fibers to make the fiberboards. In both methods, the coupling agents used were PAT 2529/RC4 from Wurtz (Wurtz), Ethomeen C/15 from AkzoNobel (C15), Mulsifan PEG 600 dioleate from Zschimmer-Schwarz (600DO), Triton X-35 from Dow (X35), and APG325 from BASF (APG). For each coupling agent in method 1), three concentrations were used: 0.50%, 1%, and 2%; and for each coupling agent in method 2), two concentrations were used: 0.5% and 1%. Control fiberboards were also made with mixed tropical hardwood fibers (Hardwood) (no coupling agent) and with Acacia fibers (Acacia) (no coupling agents), both with UF binder. FIG. 8 shows the water drop lifetimes (min) of the boards. The bars labeled "Mix" were made using method 2), while the remaining boards were made using method 1. Water drop lifetime results indicate that the hydrophilicity of Acacia fiberboards treated by coupling agents using method 1) are very close to the mixed tropical hardwood board.

EXAMPLE 5

Figure 9:
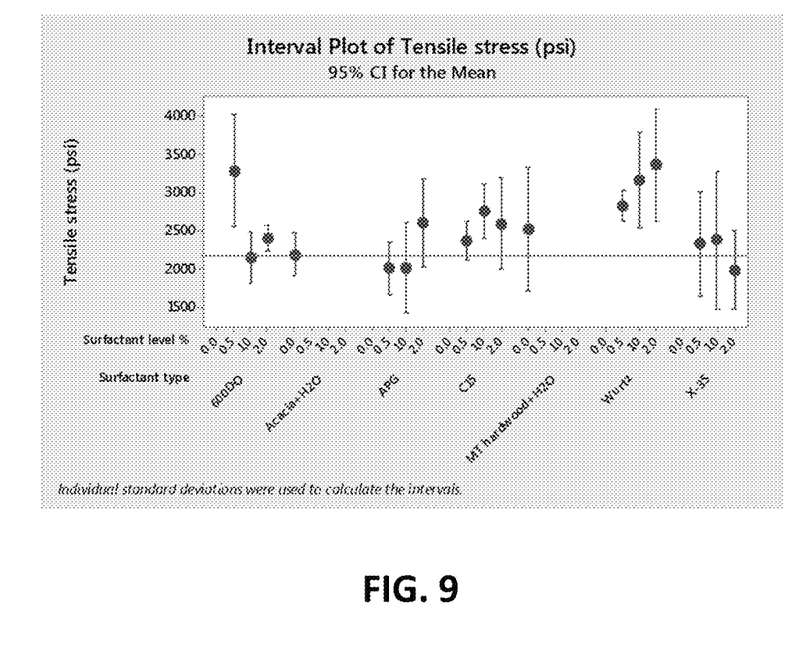
FIG. 9 is a graph showing the effect of coupling agents on the tensile stress of fiberboards made front *Acacia* fibers using a first method.
Figure 10:
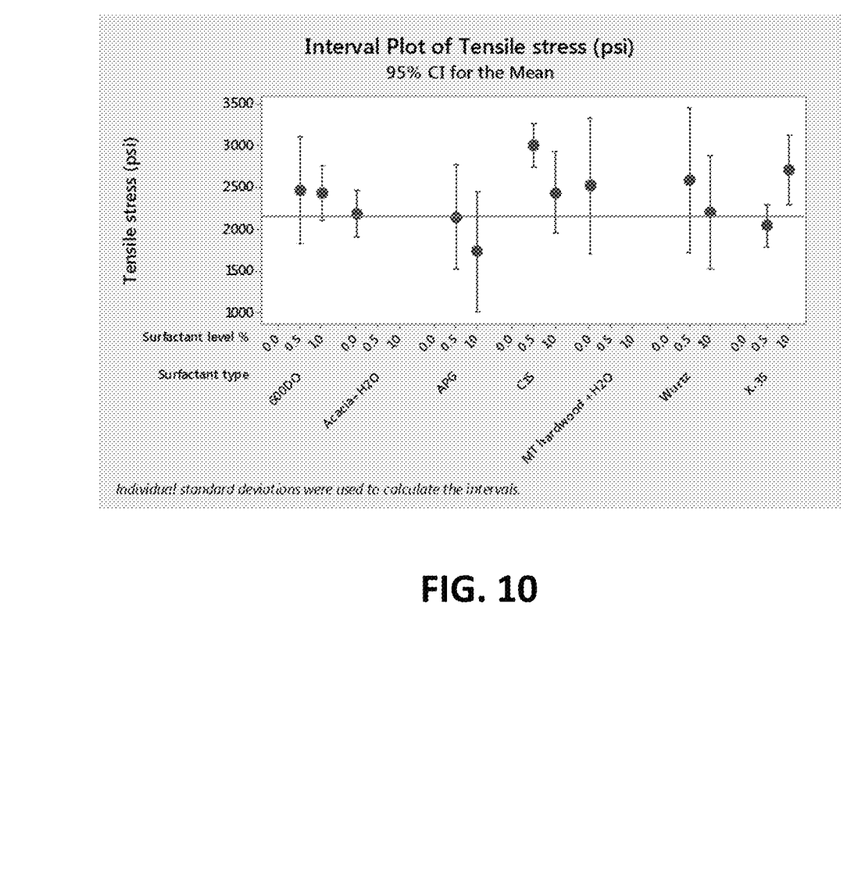
FIG. 10 is a graph showing the effect of coupling agents on the tensile stress of fiberboards made from *Acacia* fibers using second method.

The coupling agents were also investigated for their effect on the tensile strength of fiberboards made from Acacia fibers. The fiberboards, including control fiberboards, were made by the two methods as describe in Example 4. FIG. 9 shows the tensile stress (PSI) of the fiberboards made using method 1); and FIG. 10 shows the tensile stress (PSI) of the fiberboards made using method 2) (the dashed line in FIGS. 9 and 10 show the tensile strength of fiberboards made from untreated *Acacia* fibers). The coupling agent did not adversely affect the mechanical properties of *acacia* fiberboard sample. In fact, in some cases the tensile stresses increased in the presence of the coupling agent.

EXAMPLE 6

The coupling agents were also investigated for the effect of the order of treatment. Five different ways to add the coupling agents were investigated: A) the coupling agent was first mixed with the binder to form a mixture which was then applied to the *Acacia* fibers; B) the coupling agent was applied to a mixture of *Acacia* fibers and binder; C) the coupling agent was applied to the *Acacia* fibers at the same time as the binder; D) the coupling agent was added to the *Acacia* fibers to form a mixture to which the binder was then added; and E) the coupling agent was first mixed the binder to form a mixture which was then added to the *Acacia* fibers and additional coupling agent (combination of A and C). Two different coupling agents, Ethomeen C/15 from AkzoNobel (C15) and Mulsifan PEG 600 dioleate from Zschimmer-Schwarz (600DO), were studied at a concentration of 2%. The control was made using *Acacia* fibers without any coupling agent. UF was used as a binder in all cases. The *Acacia* fibers of A to E were used to make fiber mats and mat spring back for each of the mats was measured as noted in Example 2. The mat height after swing back is shown in mm in Table 1 below. The *Acacia* fibers of A to E were subjected to fiber immersing time in water as noted in Example 3. The time to complete immersion (fiber immersion time) in minutes is shown in Table 1 below. The *Acacia* fibers of A to E were also used to make fiberboards which were then subjected to water drop lifetime analysis as note in Example 4. The water drop lifetime in minutes is shown in Table 1 below. Mat cracking level was also noted as a percentage of the total boards and shown in Table 1. Overall, the coupling agent treatment increased the hydrophilicity of the *Acacia* fibers (decreased water drop lifetime, fiber immersion time, and mat height) and decreased the fraction of cracked boards when compared to untreated *Acacia* fibers.

TABLE 1

| Treatment | Coupling agent | Mat Cracking Level (%) | Water Drop Lifetime on board (min) | Fiber Immersion Time (min) | Mat Height (mm) |
| --- | --- | --- | --- | --- | --- |
| Control | x | 75 | 90 | 1200 | 38 |
| A | 600DO | 65 | 20 | 156 | 36 |
| B | 600DO | 41 | 1 | 1 | 37 |
| C | 600DO | 24 | 1 | 1 | 34 |
| D | 600DO | ?? | 1 | 9 | 34 |
| C | C15 | 47 | | 60 | 35 |
| A | C15 | 55 | 30 | 1200 | 35 |
| E | C15 + C15 | 48 | 60 | 218 | 31 |

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A composite article, comprising: a hydrophobic cellulosic material, a coupling agent, and a binder, wherein the coupling agent is present throughout the article and has a hydrophilic/lipophilic balance (HLB) of about 7 to about 15, and wherein the binder comprises urea formaldehyde (UF), phenol formaldehyde (PF), melamine urea formaldehyde (mUF), polymethylene poly(phenyl isocyanates) (pMDI), or combinations thereof.

2. The composite article of claim 1, wherein the hydrophobic cellulosic material is *Acacia* wood, *Eucalytus* wood, cypress wood, rice straws, wheat straws as annual fibers, or combinations thereof.

3. The composite article of claim 1, wherein the coupling agent is an organic compound having a lipophilic portion and a hydrophilic portion.

4. The composite article of claim 3, wherein the lipophilic portion comprises linear or branched olefins of C4 to C30.

5. The composite article of claim 4, wherein the hydrophilic portion comprises hydroxyl groups, carboxyl groups, carbonyl, esters, ethers, glucoside, or combinations thereof.

6. The composite article of claim 1, wherein the coupling agent comprises an ether, an ester, an amine, an amide, or a glucoside.

7. The composite article of claim 6, wherein
A) the ether has the chemical formula

(I)

B) the ester has the chemical formula

(II)

C) the amine has the chemical formula (III)

(D) the amide has the chemical formula (IV)

or (E) the glucoside has the chemical formula (V)

wherein R is a saturated or unsaturated hydrocarbon chain having 9 to 30 carbons, preferably 9 to 18 carbons; and n is an integer of 2 to 15.

8. The composite article of claim 1, wherein the coupling agent comprises polyoxyethylene dioleate, dilaurate ester, polyoxyethylene alkylamines, alkyl polyglucosides, octylphenol ethoxylate, t-octylphenoxypolyethoxyethanol, ethoxylated tridecyl alcohol, or combinations thereof.

9. The composite article of claim 1, wherein the coupling agent is polyoxyethylene dioleate or polyoxyethylene alkylamines.

10. The composite article of claim 1, wherein the ratio of coupling agent to hydrophobic cellulosic material is about 0.1 wt % to about 5 wt %.

11. The composite article of claim 1, further comprising a non-lipophilic cellulosic material, wherein the non-lipophilic cellulosic material and the lipophilic cellulosic material form a total cellulosic material.

12. The composite article of claim 11, wherein the total cellulosic material comprises about 10 wt % to about 98 wt % of the hydrophobic cellulosic material base on the total weight of the total cellulosic material.

13. The composite article of claim 11, wherein the total cellulosic material comprises greater than 25 wt % of *Acacia* fibers, with the balance being made up of mixed tropical hardwood.

14. The composite article of claim 1, wherein the composite article comprises about 10 to about 98 wt % of the hydrophobic cellulosic material.

15. The composite article of claim 14, wherein the composite article comprises about 0.1 to about 5 wt % of the coupling agent.

16. The composite article of claim 15, wherein the composite article comprises about 2 to about 12 wt % of the binder.

17. A door skin comprising the composite article of claim 1.

18. A composite article, comprising:
a) a hydrophobic cellulosic material;
b) a non-lipophilic cellulosic material, the non-lipophilic cellulosic material and the lipophilic cellulosic material form a total cellulosic material;
c) a coupling agent; and
d) a binder,
wherein the coupling agent is present throughout the article and has a hydrophilic/lipophilic balance (HLB) of about 7 to about 15, and wherein the total cellulosic material comprises about 10 wt % to about 98 wt % of the hydrophobic cellulosic material base on the total weight of the total cellulosic material.

19. A composite article, comprising:
a) a hydrophobic cellulosic material;
b) a non-lipophilic cellulosic material, the non-lipophilic cellulosic material and the lipophilic cellulosic material form a total cellulosic material;
c) a coupling agent; and
d) a binder,
wherein the coupling agent is present throughout the article and has a hydrophilic/lipophilic balance (HLB) of about 7 to about 15, and wherein the total cellulosic material comprises greater than 25 wt % of *Acacia* fibers, with the balance being made up of mixed tropical hardwood.

* * * * *